(12) United States Patent
Tateno et al.

(10) Patent No.: US 6,942,812 B2
(45) Date of Patent: Sep. 13, 2005

(54) METHOD OF MANUFACTURING ETALON

(75) Inventors: Ryo Tateno, Kyoto (JP); Masaru Koeda, Kyoto (JP); Satoshi Irikuchi, Atsugi (JP)

(73) Assignee: Shimadzu Corporation, Kyoto (JP)

( * ) Notice: Subject to any disclaimer, the term of this patent is extended or adjusted under 35 U.S.C. 154(b) by 101 days.

(21) Appl. No.: 10/281,165

(22) Filed: Oct. 28, 2002

(65) Prior Publication Data

US 2003/0146189 A1 Aug. 7, 2003

(30) Foreign Application Priority Data

Feb. 7, 2002 (JP) ........................................ 2002-030720

(51) Int. Cl.[7] .............................................. G01B 9/02
(52) U.S. Cl. .............................. 216/2; 216/24; 216/66; 216/67; 216/80
(58) Field of Search ......................... 216/2, 24, 66, 216/67, 80

(56) References Cited

U.S. PATENT DOCUMENTS

| | | | | | |
|---|---|---|---|---|---|
| 5,021,121 | A | * | 6/1991 | Groechel et al. | 438/712 |
| 6,005,995 | A | * | 12/1999 | Chen et al. | 385/24 |
| 6,323,987 | B1 | * | 11/2001 | Rinaudo et al. | 359/260 |
| 6,421,365 | B1 | * | 7/2002 | Kleinschmidt et al. | 372/108 |
| 6,464,842 | B1 | * | 10/2002 | Golovchenko et al. | 204/192.13 |
| 6,639,682 | B2 | * | 10/2003 | Neily et al. | 356/504 |

* cited by examiner

*Primary Examiner*—Allan Olsen
(74) *Attorney, Agent, or Firm*—Manabu Kanesaka (57) ABSTRACT

In producing an etalon, a thickness of an etalon base plate is measured, and the etalon base plate is placed in a process chamber. Then, a gas having a chemical reactivity with respect to a material of the etalon base plate is introduced into the process chamber, and a surface of the etalon base plate is etched for only a predetermined time corresponding to a thickness of the etalon base plate, thereby obtaining the etalon having a desired thickness.

18 Claims, 6 Drawing Sheets

METHOD OF MANUFACTURING ETALON

BACKGROUND OF THE INVENTION AND RELATED ART STATEMENT

The invention relates to a method of producing a Fabry-Perrot etalon (hereinafter referred to simply as "etalon"), which is a narrow-band frequency filter to be used for a semiconductor laser excitation solid-state laser apparatus, a high resolution spectroscope, a wavelength multiplex communication and the like.

It is very important in practical use to obtain a single longitudinal mode laser with excellent coherence in a space region as well as a frequency (or wavelength) region from a multiple longitudinal mode laser (i.e. a number of oscillation wavelengths), which is generated in a second harmonic solid laser apparatus using a semiconductor laser as a light source. Therefore, it has been conventionally practiced to install a narrow band frequency filter with high permeability in a laser oscillator to obtain the single longitudinal mode laser with a desired wavelength from a plurality of oscillation spectra.

The etalon is roughly classified into two types, called an air space type etalon and a solid type etalon. The air space type etalon is structured such that a pair of semi-transparent mirrors is fixed by some means with a constant space therebetween. The solid type etalon is structured such that semi-transparent films are coated on both sides of a flat surface plate, respectively. In the air space type etalon, it is required to control the two mirrors to be parallel. On the other hand, since the solid type etalon is formed of one flat surface plate, it is not required to control the parallel position with respect to the other member to obtain a stable performance.

In the solid type etalon, a peak wavelength of transmitted laser is determined by a thickness d of the etalon, a refraction index n of a material of the etalon and an incident angle θ of the laser beam with respect to the etalon. In order to obtain the laser with a desired wavelength (i.e. a wavelength to be extracted by using the etalon from a plurality of the oscillation wavelengths) at a high output efficiency, the theoretical values for these three parameters have to be applied to an optical system with a high precision, so that the peak transmitted wavelength through the etalon matches the desired peak wavelength of the laser. Among the above-stated parameters, the parameter determined by production precision of the etalon is the thickness d.

In order to obtain the laser with desired output efficiency, it is necessary that a displacement between the wavelength extracted by the etalon and the desired wavelength of the laser is less than a full width at a half height of the desired laser peak. To attain this, the thickness of the etalon should be maintained within an allowance of an order of 10 to several nm. However, with the existing technology, the process with such a high precision has been difficult. Therefore, the displacement due to a variation of the thickness d is compensated by the following methods: (i) adjusting an installation angle of the etalon; (ii) changing the refraction index n; (iii) changing the refraction index n and the thickness d by controlling a temperature. However, it is practically impossible to change the refraction index, and a structure of the laser resonator becomes complicated to change the installation angle or control the temperature, resulting in a higher cost.

In view of the above problems, the present invention has been made and an object of the invention is to provide a method of producing the etalon with a desired thickness at high precision.

Further objects and advantages of the invention will be apparent from the following description of the invention.

SUMMARY OF THE INVENTION

To solve the above problems, a method of producing an etalon according to the present invention includes (a) measuring a thickness of an etalon base plate, (b) placing the etalon base plate in a process chamber, (c) introducing a gas having a chemical reactivity with respect to a material of the etalon base plate into the process chamber, and (d) etching a surface of the etalon base plate only for a predetermined time corresponding to a thickness of the etalon base plate, thereby obtaining the etalon having a desired thickness.

DETAILED DESCRIPTION OF THE PREFERRED EMBODIMENT

First, an etalon base plate is prepared by a conventional way, i.e. mechanical grinding (hereinafter referred to an "etalon base plate" before the etalon plate is subjected to a process of the present invention, and an "etalon product" after the etalon base plate is processed). Then, a thickness of the etalon base plate is measured.

The etalon base plate is installed in a reaction chamber, and a gas having a chemical reactivity with respect to the etalon base plate is introduced into the reaction chamber. In a case that a material of the etalon base plate contains silicon dioxide (hereinafter referred to as "$SiO_2$") as a main component, such as quartz or optical glass provided with various characteristics, it is preferable to use a mixed gas of a trifluoro-methane (hereinafter referred to as "$CHF_3$") gas and an argon (hereinafter referred to as "Ar") gas as the reactive gas. Precisely speaking, although the $CHF_3$ gas has the chemical reactivity with respect to $SiO_2$ rather than the Ar gas, it is preferable to mix the Ar gas with the $CHF_3$ gas to prevent a surface of the etalon base plate from becoming rough due to rapid etching. Thus, it is preferable that a mixing ratio of the $CHF_3$ gas and the Ar gas is in a range of 9:1 to 5:5. However, as long as an etching gas effectively etches the etalon material without causing a rough surface, any gas may be used. For example, in the case of the quartz and the optical glass, tetrafluoro-methane (hereinafter referred to as "$CF_4$") may be used in addition to $CHF_3$. For the same reason, a mixture of these gases and Ar and $O_2$ may be used.

Then, an ion beam of the above-stated gas is produced, thereby performing an ion-beam etching on the etalon base plate for only a predetermined time. The ion-beam etching is a preferable etching method for such reasons that a surface with good flatness can be obtained and the etching time can be easily controlled, so that the etching quantity can be accurately controlled. The ion beam can be produced by various methods that have been conventionally used.

The etching time is calculated in advance from a difference between the previously measured thickness of the etalon base plate and a target thickness of the etalon product, and an etching speed that is determined in advance as well.

Thus, after the etching is carried out for the predetermined time, the etalon product having the desired thickness can be accurately obtained within a necessary allowance.

According to the method of the invention, it is possible to produce the etalon product with the desired thickness within a necessary thickness allowance required when the etalon product is used for a laser resonator or the like. Therefore, in the laser resonator, it is possible to match the peak transmitted wavelength through the etalon to the desired laser peak wavelength at a high precision without carrying out the complicated installation angle adjustment and temperature control, so that the output efficiency of the laser resonator can be improved.

Next, a method of manufacturing an SF11 glass solid-type etalon as an embodiment according to the present invention will be explained.

(i) Preparation of Etalon Base Plate

First, an etalon base plate is prepared by using a two-side wrapping device through mechanical grinding to form a disc shape with a thickness of $d_1=320.0\,\mu m$ and a diameter of 30 mm.

(ii) Measurement of Thickness of the Etalon Base Plate

The thickness of the etalon base plate can be measured by various methods, and in the present embodiment, the thickness is measured by a method using a spectroscope with a precision of 10 nm as described below.

Generally, the thickness d of the etalon can be expressed by, $$m \cdot \lambda = 2 \cdot n \cdot d \cdot \cos\theta \quad (1)$$

where $\lambda$ is a transmitted wavelength of the etalon, m is an interference order, n is a refraction index and $\theta$ is an incident angle of the laser.

Thus, it is possible to obtain the thickness $d_1$ of the etalon by measuring the wavelength $\lambda_1$ of the laser transmitted through the etalon, and entering n, $\theta$ and the interference order m to the equation (1). With a sufficiently small value $\theta$ and an adequate measurement precision of $\lambda_1$ and n, the thickness $d_1$ can be obtained at a precision of 10 nm. Here, when a thickness of the etalon is in the order of 100 $\mu m$, a measurement precision of five digits is required in order to secure a thickness allowance of 10 nm. Therefore, $\lambda$ and n used for calculating $d_1$ are also required to have the measurement precision of five digits.

Figure 2:
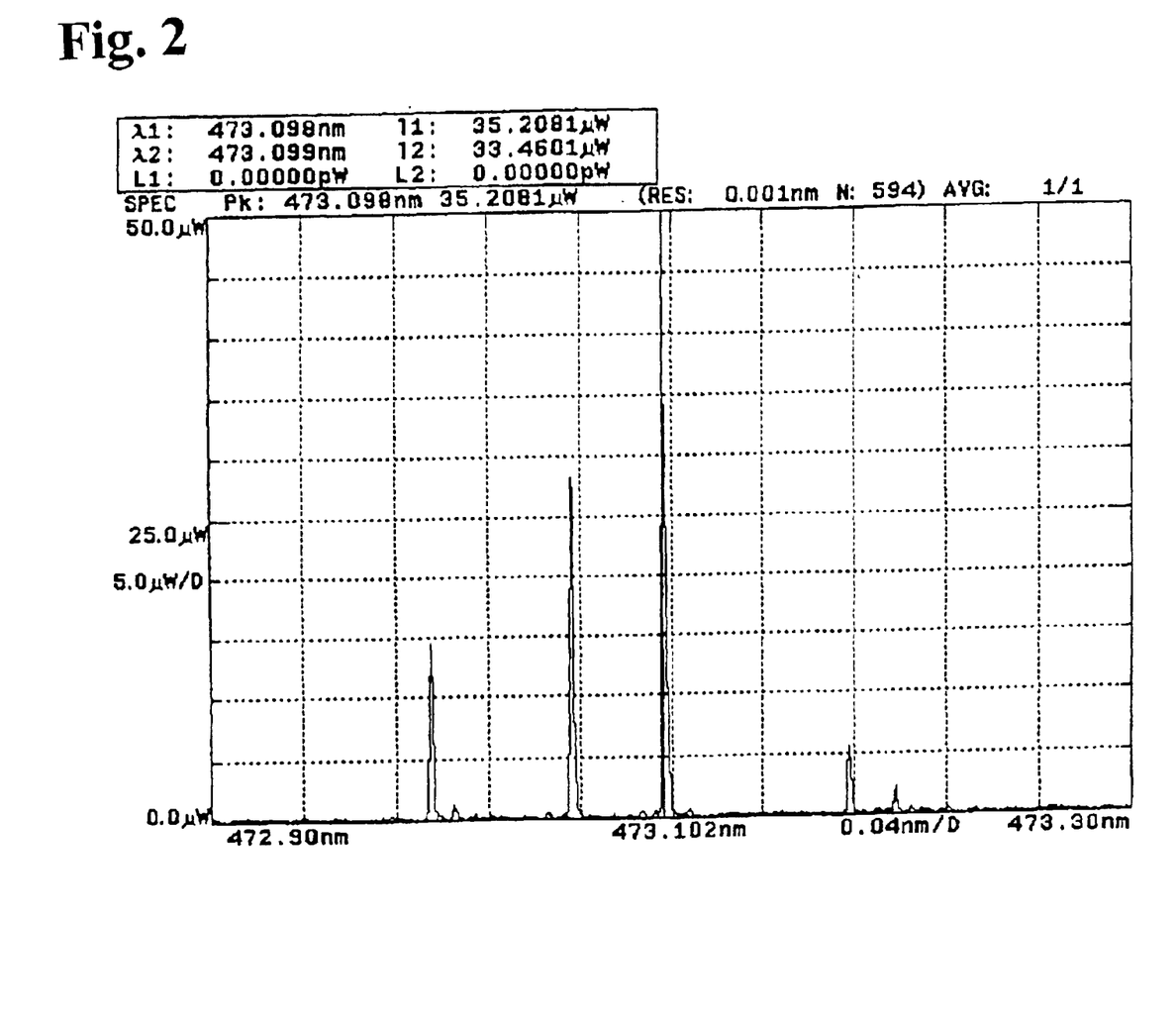
FIG. 2 is the second harmonic spectrum obtained from a basic wave laser beam of a wavelength of 946.199 nm measured by a spectrum analyzer in a case that an etalon is not inserted.
Figure 3:
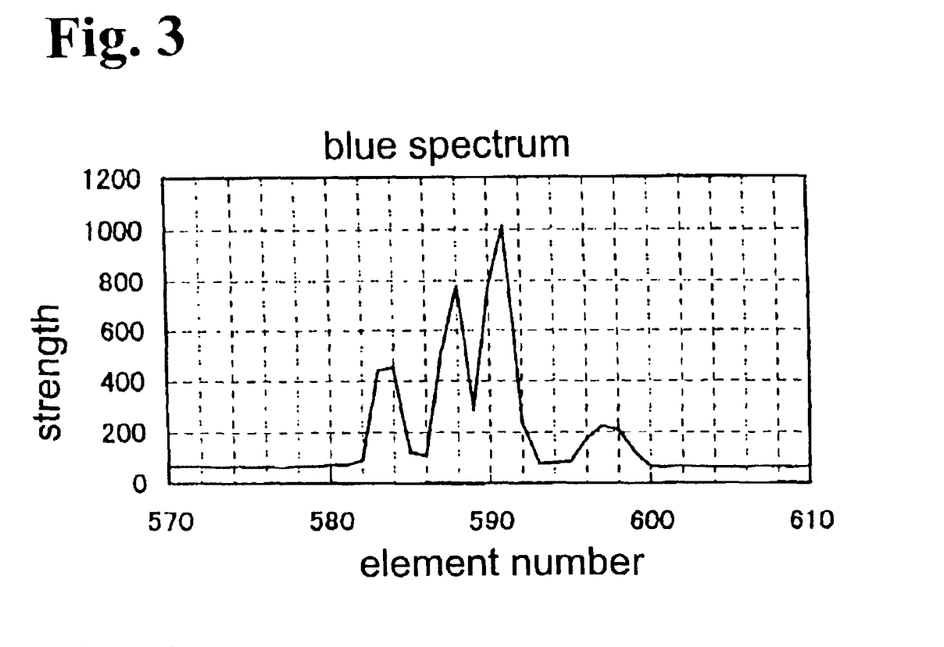
FIG. 3 is the second harmonic spectrum obtained from a basic wave laser beam of a wavelength of 946.199 nm measured by a spectroscope in a case that the etalon is not inserted.
Figure 4:
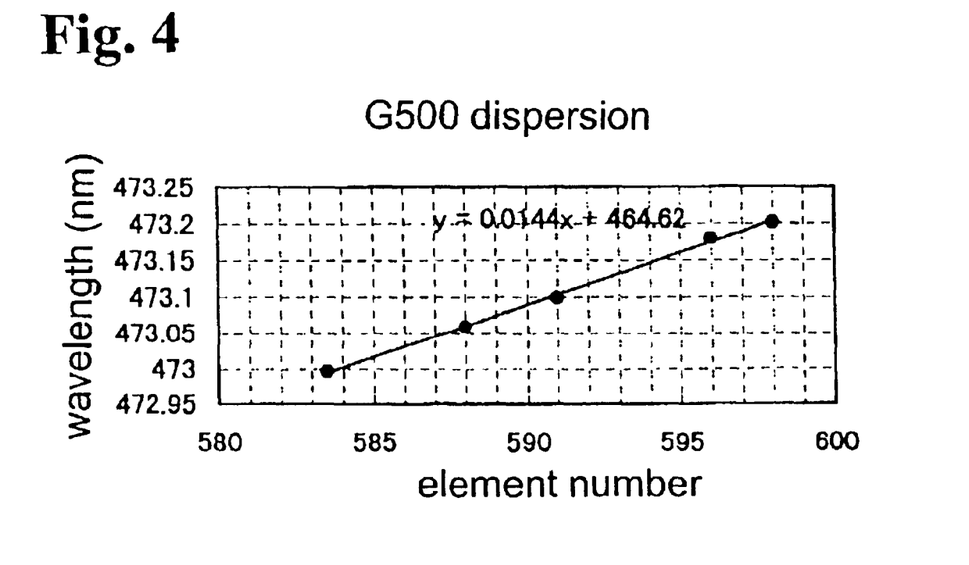
FIG. 4 is a graph showing a relationship between element numbers and wavelengths detected by the spectroscope obtained from FIG. 2 and FIG. 3.

Specifically, first, a spectrum in the vicinity of a second harmonic (473 nm, Blue Line) of a multi-mode laser of a basic wavelength $\lambda_1=946.199$ nm outputted from the laser resonator is measured by a spectrum analyzer in a state where the etalon base plate is not inserted into the laser resonator. The result is shown in FIG. 2. Next, in the same manner, in the state where the etalon base plate is not inserted into the laser resonator, the spectrum in the vicinity of the second harmonic is measured with the spectroscope. The result is shown in FIG. 3, wherein the horizontal axis represents element numbers detected by the spectroscope. By comparing the respective peak values in FIGS. 2 and 3 with each other, a relationship between the element number and the wavelength of the spectroscope can be obtained as shown in FIG. 4. From the graph shown in FIG. 4, it is found that the relationship between the wavelength and element number in a wavelength region in the vicinity of the second harmonic is 0.144 nm/element. Therefore, assuming that the basic wavelength of the laser resonator is $\lambda_1=946.199$ nm, the corresponding relationship between the wavelength and the element number is 0.288 nm/element.

Figure 5:
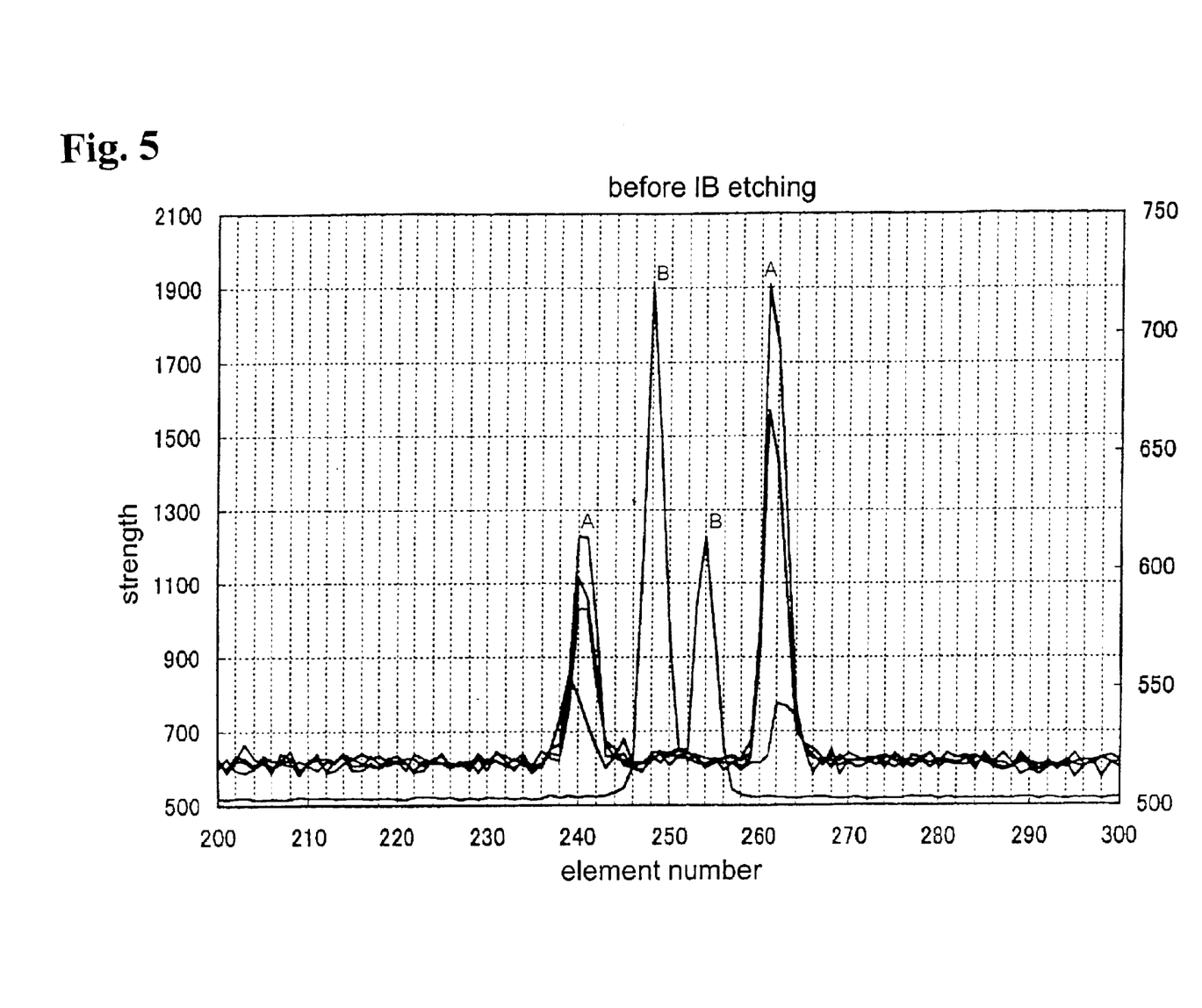
FIG. 5 is a graph showing basic wave laser beam spectra in a case that the etalon base plate obtained by mechanical grinding is inserted.

Next, the etalon base plate, obtained as described above, is inserted into the laser resonator, and the spectrum of the output light is measured by the above-stated spectroscope. The results are shown in FIG. 5 (shown by A in the drawing). The measurements are carried out at four different points per one etalon base plate. Also, in FIG. 5, there is shown a spectrum of the output light measured without inserting the etalon base plate, which is shown by B in the drawing. From the drawing, it is found that the main peak wavelength $\lambda_1$ (an element No. 261) in the case of inserting the etalon base plate and the main peak wavelength $\lambda_0$ (an element No. 248) in the case of no insertion of the etalon base plate are displaced by 13 elements of the spectroscope. By using the above-obtained distributed values, the displacement between the above-stated $\lambda_1$ and $\lambda_0$ at the basic wavelength is 0.0288 nm/element×13 elements=0.3744 nm. Also, the main peak wavelength $\lambda_1$ in the case of inserting the etalon base plate is 0.374 nm+946.199 nm (value of $\lambda_0$)=946.573 nm.

The transmitted wavelength $\lambda$ of the etalon satisfies the equation (1), as described above. In the present embodiment, n=1.75818 (a refraction index of the used SF11 glass) and $\theta=0.2°$ are already known. When the etalon product having $d=320.0\,\mu m$ is subjected to transmission of the main peak of the basic wavelength, m is determined to be 1189.2 from the equation (1) by using above mentioned n, $\theta$ and $\lambda_0=946.199$ nm. Since m is an integer, it can be considered that m=1189. The variation of m from the integer is originated from the fact that m is assumed to be $d=320.0\,\mu m$. Thus, by using n, $\theta$, $\lambda_0$ and m=1189, a target thickness of a desired etalon product for the main peak of the basic wave laser beam to transmit therethrough is determined to be $d_0=319.944\,\mu m$ from the equation (1). Since $\lambda_0$ and n have precision of five digits, cos $\theta$ is 0.99999 (the precision of five digits) within an error of $\theta$, and m is an integer, it can be concluded that do is also obtained with the precision of five digits, i.e. with precision of 10 nm.

On the other hand, in a case that m=1189 and $\lambda_1=946.573$ nm obtained above are used, the thickness of the etalon base plate, prepared above, is $d_1=320.070\,\mu m$ from the equation (1). In the same manner as described above, $d_1$ also has a precision of 10 nm.

(iii) Determination of Etching Quantity and Etching Time

From the above calculation, a quantity $\delta_d$ to be etched from the etalon base plate is determined to be $\delta_d=d_1-d_0=126$ nm.

In the present embodiment, a mixed gas containing 60% of $CHF_3$ and 40% of Ar is used as the etching gas. By using this etching gas, an etching rate of the same material (the SF11 glass) as that of etalon base plate is measured in advance to be r=0.56 nm/sec. Therefore, in the case of the above-stated etalon base plate, a time t for etching is determined to be $t=\delta_d/r=225$ seconds.

(iv) Etching

Figure 1:
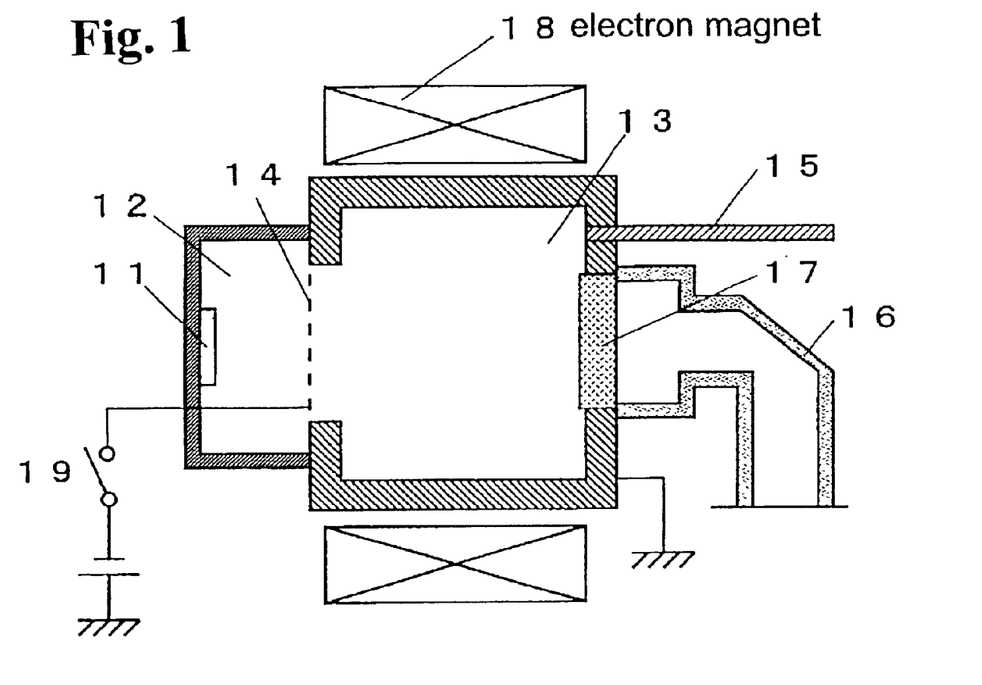
FIG. 1 is a sectional view showing an example of an ion beam irradiation apparatus for embodying a method according to the present invention.

FIG. 1 shows an electron-cyclotron-resonance (hereinafter referred as "ECR") type ion beam irradiation apparatus used in the present embodiment. First, the above-stated etalon base plate 11 is placed in a sample chamber 12. Next, the etching gas is introduced through a gas introducing pipe 15. In the present embodiment, the mixture of 3 sccm of the $CHF_3$ gas and 2 sccm of the Ar gas is used.

A microwave having a frequency of 2.45 GHz is introduced into an ion gun chamber 13 through a microwave introduction window 17 from a wave-guide pipe 16. At the same time, a magnetic field of 87.5 mT is applied to the ion gun chamber 13 from an electromagnet 18. With this, the mixed gas is ionized to be a plasma state.

When the plasma was filled in the ion gun chamber, a switch 19 is turned on to apply a DC voltage to an electrode plate 14. Thus, the plasma in the ion gun chamber 13 is moved toward the electrode plate and collided with the etalon base plate 11, thereby starting the etching immediately.

The etching is completed upon turning the switch 19 off when a specific etching time, calculated as described above, has passed after the start of the etching. In the ion beam irradiation apparatus of the present embodiment, since the etching is immediately completed right after the DC voltage is applied, the etching is precisely carried out for a set time.

Figure 6:
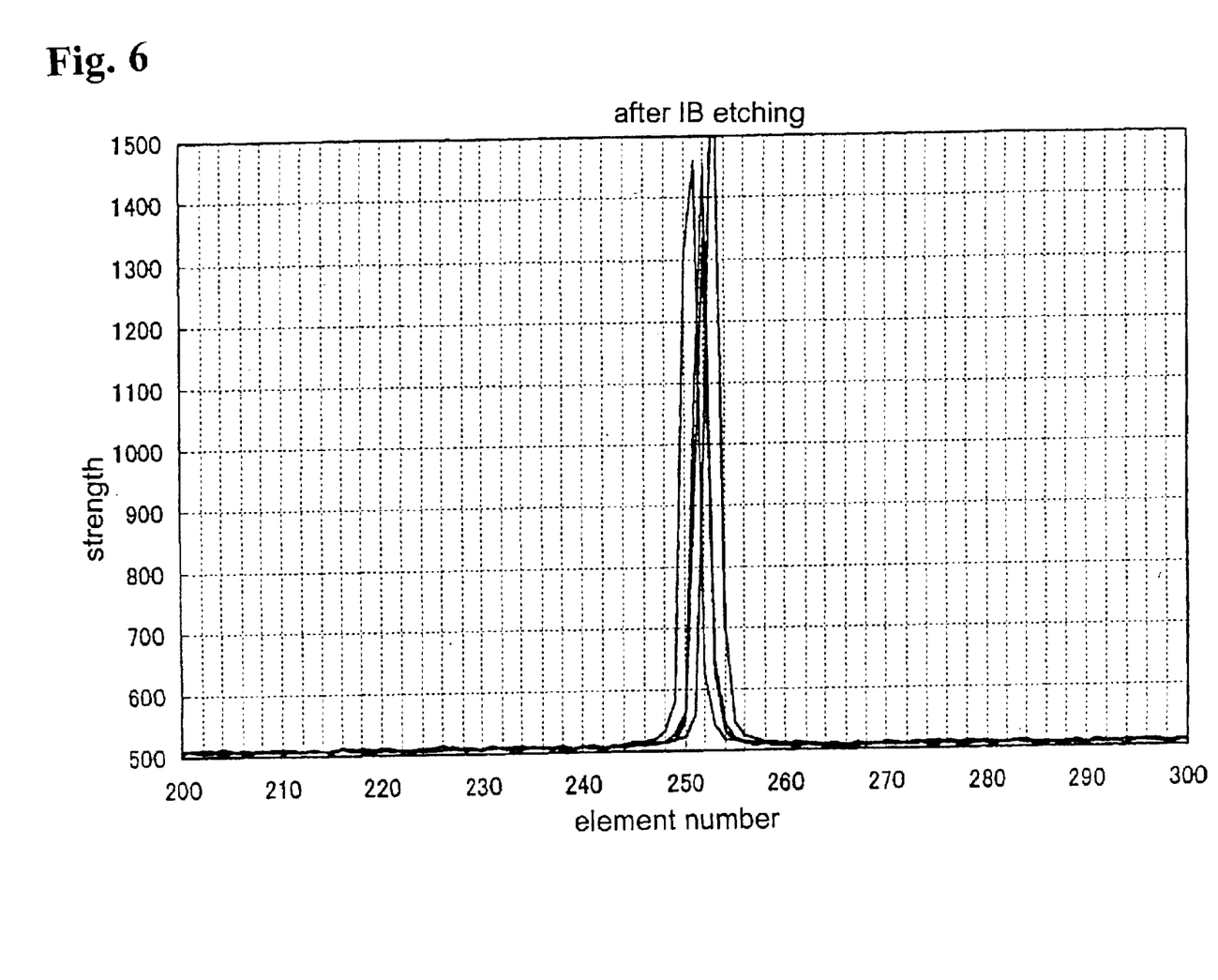
FIG. 6 is a graph showing basic wave laser beam spectra in a case that an etalon product obtained according to a method of the invention is inserted.

After the etching, the etalon product is inserted into the laser resonator, and the second harmonic spectrum obtained from the basic wave laser beam of a wavelength of 946.199 nm is measured by the spectroscope, as shown in FIG. 6. From FIG. 6, it is found that the peak transmitted wavelength of the etalon product after the etching matches the peak oscillating wavelength (the wavelength of the spectrum having the maximum peak among the spectra in the case that the etalon base plate is not inserted, as shown in FIG. 5) of the laser output. That is, the etalon product obtained in the present embodiment satisfies the performance required as a filter.

Figure 7:
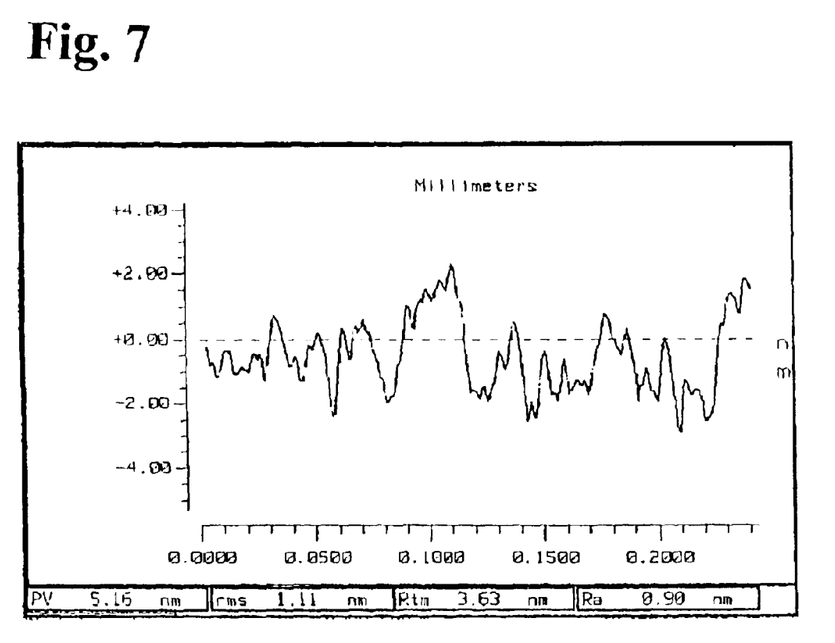
FIG. 7 is a profile curve of a surface of the etalon base plate obtained by the mechanical grinding measured by a microscope type laser interferometer.
Figure 8:
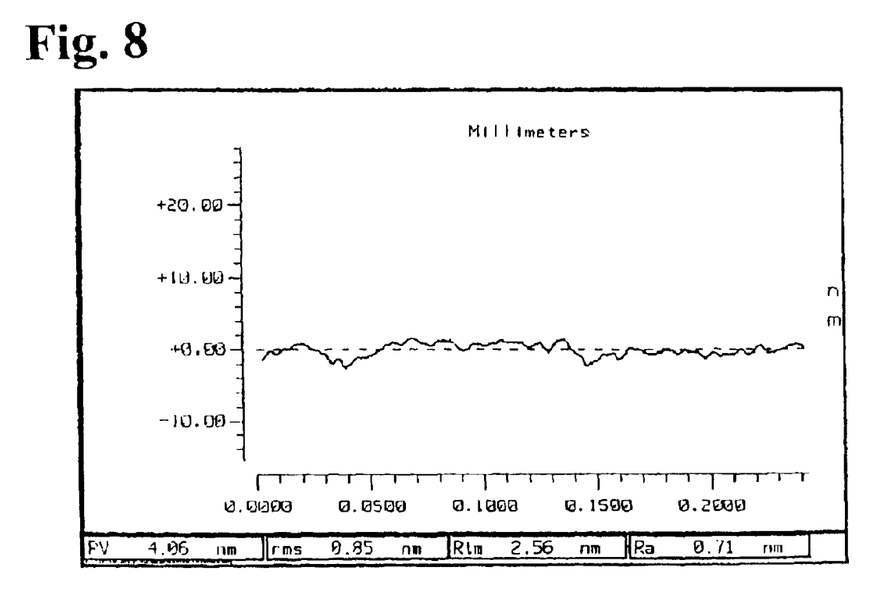
FIG. 8 is a profile curve of a surface of the etalon obtained according to the present invention measured by the microscope type laser interferometer.

Cross sectional profiles of the respective etalon surfaces before and after the etching are obtained by a microscope type laser interferometer, as shown in FIG. 7 (before the etching) and FIG. 8 (after the etching). In FIG. 8, it is found that a RMS value (a root mean square of a deviation from a center line of the profile curve) of the surface roughness of the etalon obtained in the present embodiment is 0.85 nm. Thus, it is concluded that a predetermined flatness (within 1 nm) can be obtained.

While the invention has been explained with reference to the specific embodiment of the invention, the explanation is illustrative and the invention is limited only by the appended claims.

What is claimed is:

1. A method of producing an etalon having a desired thickness, comprising the steps of:
    measuring a thickness of an etalon base plate,
    placing the etalon base plate in a process chamber,
    introducing a gas having a chemical reactivity with respect to the etalon base plate into the process chamber, and
    etching a surface of the etalon base plate by producing an ion beam of the gas for a specific time corresponding to a thickness of the etalon base plate so that the desired thickness is obtained, wherein the specific time is based on a relationship between a first selected one of a plurality of peak wavelengths of a first spectrum transmitted through the etalon base plate from a multiple longitudinal mode laser and a second selected one of a plurality of peak wavelengths of a second spectrum of the multiple longitudinal mode laser without transmission through the etalon base plate.

2. A method for producing an etalon according to claim 1, wherein said gas is a mixed gas of $CHF_3$ and Ar when a material of the etalon base plate contains $SiO_2$ as a main component.

3. A method for producing an etalon according to claim 2, wherein a mixing ratio of $CHF_3$ and Ar is in a range of 9:1 to 5:5.

4. A method for producing an etalon according to claim 1, wherein after the gas is introduced into the process chamber, the gas is ionized to have a plasma state in the process chamber.

5. A method for producing an etalon according to claim 4, wherein ions in the process chamber are attracted to hit the surface of the etalon base plate for etching.

6. A method for producing an etalon according to claim 1, further comprising matching a peak wavelength transmitted through the etalon to a desired peak wavelength.

7. A method for producing an etalon according to claim 6, where the matching step further comprises:
    measuring the first spectrum;
    measuring the second spectrum;
    determining the relationship between respective selected peak values of the first spectrum and the second spectrum; and
    determining the desired thickness based on the relationship.

8. The method of claim 1, wherein the specific time of etching the surface of the etalon base plate is based on a difference between the thickness and the desired thickness, each of which are calculated using the corresponding first selected peak wavelength and second selected peak wavelength according to the equation $$m \cdot \lambda = 2 \cdot n \cdot d \cdot \cos \theta,$$

where m is an interference order, $\lambda$ is the respective peak wavelength, n is a refraction index of the etalon base plate, d is the respective thickness and the desired thickness, and $\theta$ is an incident angle of the multiple longitudinal mode laser.

9. The method of claim 8, wherein a value of m used in calculating the desired thickness is an integer form of the value of m determined by using the thickness and the first selected peak wavelength.

10. A method for improving output efficiency of a laser resonator, comprising:
    measuring a first spectrum of a first transmitted laser output from a laser resonator without transmission through an etalon base plate;
    measuring a second spectrum of a second transmitted laser output from the laser resonator with transmission through the etalon base plate;
    developing a relationship between a desired one of a plurality of peak frequencies of the first spectrum and a selected one of a plurality of peak frequencies of the second spectrum;
    determining a desired thickness of the etalon base plate based on the relationship such that the selected peak frequency of the second spectrum substantially corresponds to the desired peak frequency of the first spectrum; and forming the etalon base plate with the desired thickness.

11. The method of claim 10, wherein forming the etalon base plate further comprises etching a surface of the etalon base plate by producing an ion beam of a gas having a chemical reactivity with respect to the etalon base plate for a predetermined time corresponding to the desired thickness.

12. The method of claim 11, wherein forming the etalon base plate further comprises regulating the desired thickness within a range of ±10 nm.

13. The method of claim 11, wherein the gas is a mixed gas of $CHF_3$ and Ar when a material of the etalon base plate contains $SiO_2$ as a main component.

14. The method of claim 13, wherein a mixing ratio of $CHF_3$ and Ar is in a range of 9:1 to 5:5.

15. The method of claim 11, wherein after the gas is introduced into the process chamber, the gas is ionized to have a plasma state in the process chamber.

16. The method of claim 15, wherein ions in the process chamber are attracted to hit the surface of the etalon base plate for etching.

17. The method of claim 10, wherein developing the relationship between the desired peak frequency of the first spectrum and the selected peak frequency of the second spectrum is based on the equation $$m \cdot \lambda = 2 \cdot n \cdot d \cdot \cos \theta,$$

where m is an interference order, $\lambda$ is the respective peak frequency, n is a refraction index of the etalon base plate, d is the respective thickness and the desired thickness, and $\theta$ is an incident angle of a multiple longitudinal mode laser.

18. The method of claim 17, wherein a value of m used in the equation in association with the desired thickness is an integer form of the value of m determined by solving the equation using the thickness and the peak frequency of the second spectrum.

* * * * *